United States Patent

[11] 3,634,064

[72] Inventors: Dmitri N. Vedensky
Cleveland, Ohio;
Ernest E. Coleman, San Francisco, Calif.
[21] Appl. No.: 809,124
[22] Filed: Mar. 21, 1969
[45] Patented: Jan. 11, 1972
[73] Assignee: The Hanna Mining Company
Cleveland, Ohio

[54] PROCESS FOR THE RECOVERY OF NICKEL FROM NICKELIFEROUS LATERITIC ORES
21 Claims, 1 Drawing Fig.

[52] U.S. Cl. .................................... 75/31, 75/33, 75/38, 75/82
[51] Int. Cl. ........................................... C21b 13/14
[50] Field of Search ........................... 75/38, 82, 33, 31

[56] References Cited
UNITED STATES PATENTS

| | | | |
|---|---|---|---|
| 2,806,779 | 9/1957 | Case........................... | 75/33 |
| 3,093,474 | 6/1963 | Collin......................... | 75/33 |
| 3,503,735 | 3/1970 | Beggs et al.................. | 75/82 X |

Primary Examiner—L. Dewayne Rutledge
Assistant Examiner—J. Davis
Attorney—Oberlin, Maky, Donnelly & Renner ABSTRACT: A process for recovering metallic nickel in which a charge of nickeliferous lateritic ore and a solid reducing agent is heated to reduce the ferric oxide content of the ore to ferrous oxide and to reduce partially the nickel oxide to metallic nickel. The partially reduced product is further heated to melt it and to produce a ferronickel product. The reducing agent provides for controlled reduction of the nickel and iron values of the ore.

PATENTED JAN 11 1972
3,634,064
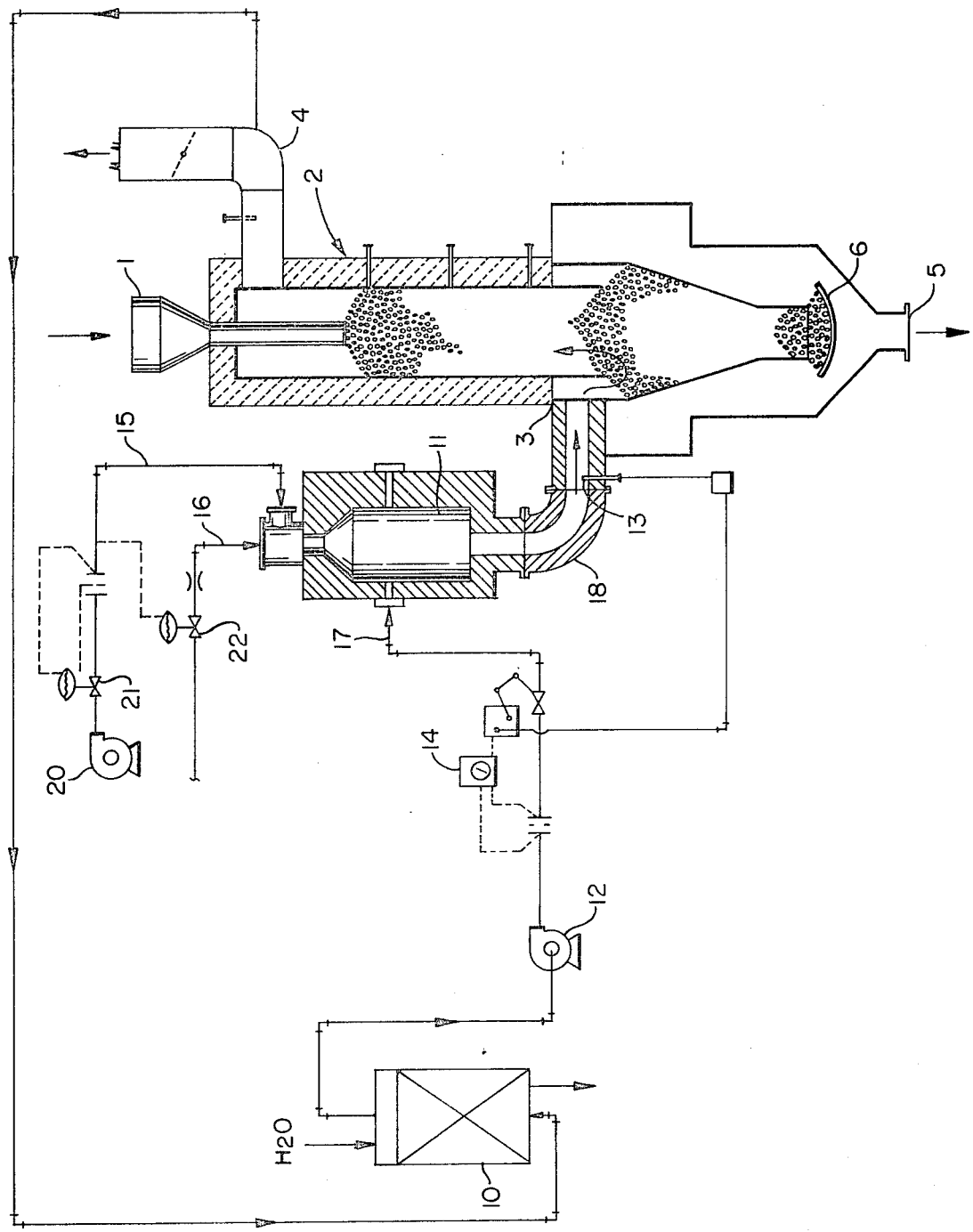
INVENTORS
DMITRI N. VEDENSKY
ERNEST E. COLEMAN
BY Oberlin, Maky, Donnelly & Renner
ATTORNEYS

PROCESS FOR THE RECOVERY OF NICKEL FROM NICKELIFEROUS LATERITIC ORES

This invention relates generally as indicated to a process for recovering metallic nickel from nickeliferous lateritic ores, and more particularly to such a process including a controlled prereduction of the nickel and iron contents of such ores. The process is conducted in two stages, higher oxides of iron being essentially reduced to FeO and some NiO to Ni in the first and prereduction stage, and the balance of NiO and a predictable amount of FeO reduced to Ni and Fe in the second or melting stage.

Nickeliferous lateritic ore deposits containing significant quantities of nickel are formed by chemical decomposition of ultrabasic igneous rocks carrying nickel and are characterized by residual or superficial enrichment of iron and some nickel at the surface and further enrichment of nickel in a saprolitic transitional zone between the iron-rich laterite at the surface and fresh bed rock in depth. The upper horizons of the deposits are high in iron and relatively low in nickel, silica and magnesia. In the saprolitic zone, the iron content decreases and the silica, nickel and magnesia contents increase. This zone thus represents a very important nickel-enriched part of the deposit.

It is characteristic of nickeliferous lateritic ores that the nickel minerals found in such deposits are extremely finely disseminated and hence cannot be concentrated by even extremely fine grinding and any known method of mechanical concentration. Moreover, in the nickel-enriched saprolite zone, the nickel occurs essentially as complex nickel-magnesia silicates or complex iron-nickel silicates in which nickel replaces part of the iron in the molecule. Because of this, it is extremely difficult to separate and recover the nickel content of such ores.

Several metallurgical processes have been adopted for the recovery of nickel from lateritic ores, including a chemical process in which the ore is first roasted with a reducing agent to convert the nickel minerals to the metallic state with the ore thereafter being subjected to an alkaline leaching process to extract the nickel. This process is quite expensive to use, and it has also been found that poor recoveries are obtained on the aforenoted saprolitic ores. In another process which has been used, nickel is dissolved from the ground ore with sulfuric acid by the use of autoclaves operated at high temperatures and pressures. In this process, high recoveries can be obtained with saprolitic ores but because of high MgO content, acid consumption becomes prohibitive.

It should thus be recognized that the existing processes for the recovery of nickel from lateritic ores leave much to be desired. Because of the valuable properties and well-known industrial uses of nickel, however, it is obviously desirable to have a practical process for separating and recovering metallic nickel from the ore deposits in which it occurs. Accordingly, the industry has continually sought improved processes and techniques for the recovery of nickel at a minimum of cost and effort.

It is an object of the present invention, therefore, to provide a process for the recovery of metallic nickel from nickeliferous lateritic ores which can be used with varying compositions of such ores and obtain high recoveries of the nickel content of the original ore in the form of ferronickel of controllable and desired grade.

Another object of this invention is the provision of a relatively simple process for the recovery of nickel from lateritic ores in which high grade ferronickel is produced with a high recovery of nickel present in the ore.

A further object of this invention is the provision of a process for the recovery of metallic nickel from nickeliferous lateritic ore utilizing a selected carbonaceous reducing agent or agents possessing properties that will provide for controlled reduction in the two stages of the process.

Other objects, features and advantages of this invention will be apparent to those skilled in the art after a reading of the following more detailed description.

To the accomplishment of the foregoing and related ends, the invention, then, comprises the features hereinafter fully described and particularly pointed out in the claims, the following description and the annexed drawing setting forth in detail an illustrative embodiment of the invention, this being indicative, however, of but one of the various ways in which the principle of the invention may be employed.

In said annexed drawing:

A flowsheet is shown illustrating schematically the general process of the present invention.

The above and other objects are achieved by this invention in which a process for recovering metallic nickel is provided utilizing a reducing agent which provides for controlled reduction of the nickel and iron values of the lateritic ore. Such reducing agents, which are in particulate form, can be intimately admixed with the lateritic ore and heated to effect a partial reduction of the ore, reducing the ferric oxide to ferrous oxide and reducing a part of the nickel oxide to metallic nickel. The thus partially reduced product is subsequently further heated to a complete melt to produce the desired ferronickel product, which can be recovered and refined as necessary.

The reducing agent contains two reductants. The first reductant is highly reactive when heated in the presence of metal oxides at furnace temperatures and is thus capable of reacting readily with the nickel and iron values of nickeliferous lateritic ores to produce the desired reduction of ferric oxide to ferrous oxide and nickel oxide to metallic nickel. The second reductant is relatively inactive and consequently will react less readily at these temperatures with the nickel and iron values of such ores than the first reductant. Accordingly, when a charge of ore and reducing agents is heated to a temperature on the order of about 1,750° F. to about 2,000° F., substantially all of the first reductant will be consumed and the ferric oxide will be reduced to ferrous oxide and at least part of the nickel oxide will be reduced to metallic nickel. After such heating, a significant quantity of the second reductant will remain and thus will be available for use in the further heating to a melting temperature to complete the reduction of the remaining nickel oxide to metallic nickel and a predetermined portion of the ferrous oxide to metallic iron.

Illustrative examples of materials suitable for use as the first reductant include high volatile, low rank coals, lignite and other carbonaceous materials containing a volatile content on the order of about 40 percent or greater and relatively low fixed carbon contents as for example approximately 60 percent or less. The particle size of the material, of course, affects its reactivity and accordingly will usually be about 200 mesh (U.S. Standard Sieve Size) or finer. The particle size will vary, however, depending upon the reducing material used and the heat cycle selected for the process.

Examples of materials suitable as the second reductant include high temperature metallurgical coke, calcined petroleum coke and other materials which have a high percentage of fixed carbon and which are substantially nonreactive with the metal values of lateritic ores at selected temperatures generally within the range of about 1,750° F. to about 2,000° F. The second reductant will normally be a substantially coarser material than the first, as for example coarser than 40 mesh, although finer material can be used depending upon the specific reducing material.

Instead of the first and second reductants being different materials as described, the carbonaceous reducing agent can be composed of the same material, that is the first and second reductants can, for example, both be coke, in which instance the first or highly reactive reductant will be ground to a fine particle size, such as 200 mesh or finer. Similarly, both reductants can be coal, the second reductant also being coal but significantly coarser than the first reductant, for example 40 mesh or coarser. Under these conditions, however, the control of the process becomes difficult because of the tendency of coal to react readily at furnace temperatures.

In any event, regardless of whether the first and second reductants are of the same or different materials, the second reductant should be of such nature that a sufficient quantity of it survives the heating during the first or prereduction stage and remains in the feed to the second or melting stage to achieve the desired reduction to Ni and Fe during melting. Treating ore containing up to 2.8% Ni and variable amounts of iron, this quantity is less than 1 percent carbon to produce ferronickel containing about 50 percent nickel.

As stated previously, varying compositions of nickeliferous lateritic ores may be used. The ore deposits should, of course, have a significant nickel content, as for example, at least about 0.5 percent by weight and preferably at least about 1.0 to 1.5 percent.

The solid reducing agent and the lateritic ore are to be intimately admixed prior to heating, and this can be achieved in any suitable commercially available mixing apparatus. To facilitate mixing of the reducing agent and lateritic ore, the agent and ore can be finely ground as necessary, subject, of course, to the previously described limitation upon the reactivity of the second reductant.

The admixture of ore and reducing agent may be introduced into the heating apparatus in particulate form, but is preferably in the form of pellets, briquettes or other "compacts." The use of compacts has the advantage of providing for better heat transfer between the compacts and the heating gas and thus provides for more efficient and effective use of the reducing agent and hence better control of the reduction process.

To achieve the necessary degree of reduction of the ore, the quantity of reducing agent is generally kept within the range of from about 0.5 percent to about 6 percent by weight, based on the weight of the admixture of reducing agent and the nickel-bearing ore. The reducing agent should contain sufficient quantity of the first reductant, the reactive reductant, to reduce the ferric oxide to ferrous oxide and some nickel oxide to metallic nickel. The quantity of first reductant should also be sufficient to generate an excess of carbon monoxide in the gas exiting from the heating apparatus, a part of which is recycled, to build up the combustible content of gas used to heat the compacts and to approach the concentration for production of FeO equilibrium. The quantity of the second reductant, that is the inactive reductant, will, of course, be the balance of the reducing agent and will be sufficient to reduce the remaining nickel oxide to metallic nickel and the desired quantity of ferrous oxide to metallic iron during the second or melting stage. In general, the reducing agent will contain from approximately 10 to about 40 percent by weight, based on the total weight of the reducing agent, of the second reductant, but this is subject to considerable variance depending upon the quantity of iron and nickel in the nickeliferous lateritic ore. As stated previously, approximately 1 percent of carbon should remain after the prereduction if the ore contains about 2.8 percent nickel to produce a ferronickel product containing about 50 percent nickel. With ores containing lower percentages of nickel this amount will be reduced to produce the same grade ferronickel product.

In the process of this invention, the charge of compacts made from nickeliferous lateritic ore and carbonaceous reducing agent is preferably first heated in a shaft furnace to produce the desired prereduction of the iron and nickel oxides of the ore. The temperature for such reduction is normally within the range of from about 1,750° to about 2,000° F., and when compacts containing free moisture are processed, on the order of about 1 hour is generally required within the furnace to achieve the desired prereduction.

Alternatively, the prereduction can be carried out on a rotary hearth, but because of the short time cycle employed (less than 11 minutes) this necessitates the use of considerably higher temperatures, i.e., on the order of about 2,300° to about 2,600° F. Reduction on a rotary hearth requires that the compacts be loaded substantially as a single layer to achieve uniform heat distribution. Of course, it is possible to operate a rotary hearth at lower temperatures, but the capacity is then sacrificed and the process becomes impractical. Because of the higher temperatures employed in the rotary hearth process, a greater quantity of nickel oxide will be reduced to metal and some iron oxide will likewise be reduced to metal, but a controlled amount of residual carbon will remain for the described further reduction in the electric furnace. The use of the shaft furnace is in general preferred because of its lower temperatures and comparatively greater simplicity of operation.

After the aforedescribed prereduction has been completed, the partially reduced product is transferred hot and subsequently further heated in an electric furnace to a complete melt to produce the desired ferronickel. The electric furnace will be operated at a temperature of at least approximately 2,600° F. and usually within the range of from about 2,600° to about 3,000° F. During such heating in the electric furnace, the partially reduced product is melted and the remaining nickel oxide is reduced to metallic nickel and the desired portion of ferrous oxide is reduced to metallic iron. Suitable ferronickel products should contain a minimum of at least about 20 percent by weight nickel. Preferably, the nickel content will be at least about 45 percent and more desirably will be about 50 percent or higher.

It should be emphasized that in the prereduced hot compacts fed to the electric furnace, residual carbon is intimately mixed with and held within the ore, which creates a very favorable condition for obtaining high selectivity of reduction, that is the ability of obtaining a high grade ferronickel and at the same time a slag low in nickel. As is well known from industrial practice, this is not obtained when an unconsolidated mixture of reducing agent and ore is melted in the furnace. In such case, the reducing agent tends to float and segregate on the surface of the slag which affects adversely the selectivity of the reduction.

Referring now more particularly to the figure of the drawing, a charge of compacts made by mixing nickeliferous lateritic ore and reducing agent is fed into hopper 1 of shaft furnace 2. The temperature of the furnace charge as it passes downwardly therethrough varies from ambient at the top to the temperature of gas introduced at the bottom of the furnace. Combustion gas, at a predetermined and controlled temperature (ranging from 1,750° to 2,000° F.) is introduced into the shaft furnace through opening 3 and passed upwardly through the furnace, exiting through conduit 4. The partially reduced compacts are removed from the furnace through discharge opening 5 either into refractory lined collection containers which are not shown, or conveyed to the electric furnace hot in some other manner for the necessary further heating as described. A deflector 6 is positioned at the discharge end of the furnace to distribute the furnace product evenly about the opening to facilitate uniform and continuous discharge.

A portion of the top gas from the furnace which exits through conduit 4 is recycled for further use in the process. Such gas is circulated through a water scrubber 10 and subsequently mixed with combustion gas in chamber 11 to control the temperature of the gas entering the shaft furnace at 3. A pump 12 is provided to circulate the recycled gas through the scrubbing device and thence to the combustion chamber. Control means 14 are also provided to control the pressure as necessary.

Air and either natural gas or fuel oil are introduced into combustion chamber 11 through lines 15 and 16 respectively via pump 20 and control valves 21 and 22. The scrubbed recycle gas is admitted into the chamber through line 17. The admixture of recycle and combustion gases exits from chamber 11 through conduit 18 which connects with opening 3 of the shaft furnace. A thermocouple 13 controls the amount of cooled recycle gas thus maintaining the temperature of gas entering the furnace at 3 at the desired level.

The invention will be better understood by reference to the following specific but nonlimiting examples.

In the examples which follow, a nickeliferous lateritic ore of the following composition was used.

| Component | Analysis % |
| --- | --- |
| Nickel (Ni) | 2.80 |
| Iron (Fe) | 20.3 |
| Magnesia (MgO) | 13.4 |
| Silica ($SiO_2$) | 39.7 |
| Alumina ($Al_2O_3$) | 2.8 |
| Loss on Ignition | 9.0 |

The reducing agent used in these examples consisted essentially of a high volatile coal and a calcined petroleum coke. The coal had the following composition and was ground to the following size:

| Composition | Dry Basis |
| --- | --- |
| % Ash | 3.78 |
| % Volatile | 47.41 |
| % Fixed Carbon | 48.81 |
| | 100.00 |
| Total Carbon | 71.63 |
| % Sulfur | 0.54 |

| Mesh | % Retained | Cum. % Retained |
| --- | --- | --- |
| 100 | 1.55 | 1.55 |
| 140 | 8.54 | 10.09 |
| 200 | 21.53 | 31.62 |
| 270 | 41.76 | 73.38 |
| 325 | 10.80 | 84.18 |
| 400 | 9.25 | 93.70 |

The petroleum coke contained about 97 percent fixed carbon and was ground to the following size:

| Mesh | % Retained | Cum. % Retained |
| --- | --- | --- |
| 30 | 44.89 | 44.89 |
| 40 | 36.53 | 81.42 |
| 70 | 6.37 | 87.79 |
| 100 | 1.74 | 89.53 |
| 140 | 1.61 | 91.14 |
| 200 | 3.79 | 94.93 |
| 325 | 1.93 | 96.86 |

The coal and petroleum coke were mixed in the proportions indicated in the illustrative examples and were also admixed with the aforedescribed nickeliferous lateritic ore and converted into briquette form, containing about 16 percent surface moisture.

EXAMPLE I

In this example, a charge of briquettes of lateritic ore and reducing agent was placed in a single layer onto the hearth of a muffle furnace and heated to the below indicated temperature in a controlled reducing atmosphere to determine whether the second reductant would survive such heating and reduction so as to be available for the further heating and melting. The charge was stationary in the furnace and after heating, the charge was cooled under nonoxidizing conditions and analyzed.

The briquettes were made using 3.2 percent by weight of the previously described high volatile coal and 1 percent by weight of the previously described petroleum coke. The dried briquettes were heated at about 1,800° F. for about 20 minutes in the muffle furnace in an atmosphere containing about 3 percent combustibles (CO and $H_2$). After cooling, the fired product was analyzed. The survival of fixed carbon of the petroleum coke was 43 percent by weight.

EXAMPLE II

In this example, the previously described briquettes were charged wet at the top of a shaft furnace, and the fired briquettes were continuously discharged from such furnace and cooled under nonoxidizing conditions for subsequent further heating and melting in an electric furnace. The temperature of the gas entering the furnace was approximately 1,815° F., and it contained 2.6 percent combustibles. The gas was introduced at the bottom of the shaft furnace to provide a counterflow of solid material and gases. The top gas leaving the furnace contained 5.85 percent combustibles, indicating their buildup in the heating cycle.

The briquettes in this example were made using 3.8 percent by weight of high volatile coal and 0.9 percent by weight petroleum coke. The heated and partially reduced briquettes were analyzed to determine the residual carbon and iron and nickel values. The results of this analysis are shown in table 1.

The prereduced product of this example was subsequently further heated in a 300 kva., three-phase electric furnace of the tilting type. Approximately 547 pounds of the fired briquettes were heated in such furnace to a temperature of approximately 2,950° F. to melt the same. The products from the electric furnace were slag and ferronickel, which were sampled and analyzed for nickel and the other constituents. The results of this analysis are shown in table 2.

EXAMPLE III

The shaft furnace and procedure of example III were used, with the briquettes being made from 3.8 percent by weight coal and 0.5 percent by weight petroleum coke. The analysis of the prereduced briquettes and the electric furnace products are also shown in tables 1 and 2 respectively. Gas entering the furnace at 1,840° F. contained 2.60 percent combustibles, and top gas leaving it, 4.70 percent.

EXAMPLE IV

In this example, the shaft furnace and system of apparatus essentially as shown in the figure of drawing herein was used. The briquettes were prepared from the previously described lateritic ore and 3.8 percent by weight of the high volatile coal and 0.7 percent by weight of petroleum coke. The moist briquettes were fed into the top of the shaft furnace and the fired product was discharged into refractory lined containers which, as soon as filled, were transferred to an electric furnace. The temperature of the gas entering the furnace was about 1,825° F. and the briquettes were within the furnace for approximately 74 minutes.

The heating gas was passed through the furnace countercurrent to the flow of briquettes, such gas containing combustibles of carbon monoxide and hydrogen of approximately 9.7 percent. A part of the exit gas containing now 12.6 percent combustibles was removed from the furnace and circulated through a water scrubber, mixed with combustion gas in a mixing chamber to assist in controlling the temperature of the gas entering the furnace, and then recycled to the furnace.

The fired product from the furnace was also analyzed to determine the residual carbon content and the nickel and iron values. The results of this analysis are shown in table 1.

As indicated, the fired briquettes were taken from the shaft furnace and melted in an electric furnace as described above in example III. The slag and ferronickel from the electric furnace were also analyzed as previously described. The results of this analysis are shown in table 2.

EXAMPLE V

In this example, the prereduction was undertaken in a rotary hearth. Briquettes were made using 4 percent high volatile coal and 1 percent by weight of petroleum coke. The briquettes were dried prior to charging onto the hearth, and an approximate single layer of briquettes was maintained on the hearth. The temperature within the furnace was approximately 2,535° F. and the average time of residence for the briquettes on the hearth was approximately 9 minutes. A reducing atmosphere containing approximately 3.0 percent combustibles was maintained in the furnace. The material discharging from the rotary hearth was water quenched, dried and subsequently melted in the previously described electric furnace.

An analysis of the fired briquettes from the rotary hearth was made. The results of such analysis are shown in table 1. The slag and ferronickel from the electric furnace were also analyzed, and the results of this analysis are shown in table 2.

TABLE 1

| Example | II | III | IV | V |
|---|---|---|---|---|
| Coal added, percent | 3.8 | 3.8 | 3.8 | 4.0 |
| Petroleum coke added, percent | 0.9 | 0.5 | 0.7 | 1.0 |
| Maximum temperature, °F | 1,815 | 1,840 | 1,825 | 2,535 |
| Fired briquettes Percent: | | | | |
| Total Ni | 3.20 | 3.18 | 3.13 | 3.18 |
| Metallic Ni | 0.67 | 0.74 | 0.28 | 2.20 |
| Total Fe | 22.9 | 23.0 | 22.5 | 22.8 |
| Metallic Fe | 0.09 | 0.01 | | 1.76 |
| Ferrous Fe | 22.0 | 22.4 | 22.0 | 21.0 |
| Residual carbon | 1.41 | 0.84 | 1.06 | 0.57 |

TABLE 2

| Example | II | III | IV | V |
|---|---|---|---|---|
| Briquettes melted, pounds | 547 | 785 | 2,156 | 455 |
| Furnace feed, percent C | 1.41 | 0.84 | 1.06 | 0.57 |
| Furnace feed, percent Ni | 3.20 | 3.18 | 3.13 | 3.18 |
| Ferro-nickel produced, percent Ni | 38.05 | 54.51 | 46.94 | 50.25 |
| Slag, percent Ni | 0.126 | 0.353 | 0.213 | 0.280 |
| Nickel recovery in metal, percent | 96.1 | 89.1 | 93.3 | 91.4 |

As indicated by the results shown in table 2, high grade ferronickel can be produced by the process of this invention. Such results also indicate that the percent of recovery of the original nickel content as metallic nickel was very high, being in all instances on the order of approximately 90 percent or better with a high grade ferronickel being produced. Such results are believed to be attributable to an intimate mixture of the residual carbon in the briquette fed to the electric furnace, which is in turn the result of utilizing the described reducing agent.

Other modes of applying the principle of the invention may be employed, change being made as regards the details described, provided the features stated in any of the following claims, or the equivalent of such, be employed.

We therefore particularly point out and distinctly claim as our invention:

1. A process for the recovery of metallic nickel in the form of ferronickel which comprises heating a charge of nickeliferous lateritic ore and a uniformly admixed solid particulate reducing agent, said reducing agent comprising a first component capable of reacting readily with the nickel compounds and the iron compounds of such ore to reduce the same at a selected predetermined temperature and a second component substantially unreactive with such compounds at such temperature but capable of subsequently reacting with iron and nickel compounds present in the charge at a substantially higher temperature, first thus heating such charge at such predetermined lower temperature for a period of time sufficient to cause such first reducing agent component to reduce substantially all such iron compounds to ferrous oxide without production of an appreciable amount of metallic iron and without significant destruction of such second component and to reduce a substantial portion of such nickel compounds to metallic nickel, and subsequently heating the resultant partially reduced charge at such substantially higher temperature to react such second reducing agent component with the remaining nickel compounds to reduce the greater part thereof to metallic nickel and to react such second reducing agent component with such ferrous oxide to reduce a predetermined portion of the latter to metallic iron sufficient to produce ferronickel containing a substantial amount of iron, and melting such charge.

2. The process of claim 1, wherein such ore contains an iron content very much in excess of the nickel content, but the ferronickel produced contains at least 20 percent nickel by weight.

3. The process of claim 1, wherein such ore contains an iron content very much in excess of the nickel content, but the ferronickel produced contains at least 45 percent nickel by weight, with such nickel recovery constituting at least 90 percent of the nickel content of such ore.

4. The process of claim 1, wherein such charge is thus first heated at a temperature below 2,000° F. to effect such first reduction and subsequently heated to at least 2,600° F. to effect such further reduction and to melt such charge.

5. The process of claim 1, wherein such charge is preformed into compacts, and the individual identities of such compacts are preserved throughout such first heating stage and transfer to such subsequent heating stage.

6. The process of claim 5, wherein such compacts are formed of ground nickeliferous lateritic ore and ground solid particulate reducing agent, and such compacts are transferred in hot condition in a nonoxidizing atmosphere from such first heating stage to such subsequent heating stage.

7. The process of claim 6, wherein such solid particulate reducing agent is thus ground to two substantially different degrees of fineness, the more finely ground reducing agent component acting to prereduce such ore during such first lower temperature heating stage and the less finely ground reducing agent component acting further to reduce such ore during such second higher temperature heating stage.

8. The process of claim 5, wherein such first component is a high volatile coal and such second component is coke.

9. The process of claim 8, wherein approximately 90 percent of such coal by weight is about 200 mesh or finer and approximately 80 percent of such coke by weight is about 40 mesh or coarser.

10. The process of claim 5, wherein the total amount of reducing agent initially contained in such compacts is between about 0.5 percent and about 6 percent by weight of such compacts, and said compacts contain approximately 1 percent carbon by weight following such first heating stage and prior to such subsequent heating stage.

11. A process for the recovery of metallic nickel in the form of ferronickel which comprises preforming a charge of nickeliferous lateritic ore and uniformly admixed particulate carbonaceous reducing agent into compacts, said reducing agent comprising a first component capable of reacting readily with the nickel compounds and the iron compounds of such ore to reduce them at a relatively low temperature and a second component substantially unreactive with such compounds at such temperature but capable of subsequently reacting with nickel compounds and iron compounds present in the charge at a substantially higher temperature, passing such compacts through a shaft furnace to heat them to such relatively low temperature for a period of time sufficient to cause such first reducing agent component to reduce such iron compounds to ferrous oxide without production of metallic iron and without sticking together of such compacts and without disintegrating such compacts, and to reduce a substantial portion of such nickel compounds to metallic nickel, a substantial amount of such second component of such reducing agent surviving undestroyed in such compacts discharged from such furnace, and subsequently heating such compacts to such substantially higher temperature effective to react such second reducing agent component with the remaining nickel compounds to substantially complete the reduction of all such compounds to metallic nickel and to react such second reducing agent component with such ferrous oxide to reduce a sufficient portion of the latter to metallic iron to produce ferronickel containing a substantial amount of iron, and melting the charge.

12. The process of claim 11, wherein the ferronickel produced contains from about 20 percent to about 50 percent nickel by weight.

13. The process of claim 11, wherein such heating in such shaft furnace is at a temperature below 2,000° F., and such subsequent heating is performed in an electric furnace at a temperature of at least approximately 2,600° F. to melt such charge to produce ferronickel and slag, such heating in such shaft furnace and transfer to such electric furnace being effected under nonoxidizing conditions.

14. The process of claim 11, wherein the reaction of such first reducing agent component in such shaft furnace produces hydrogen and carbon monoxide which are removed from such furnace with the exit gas, cooled, mixed with primary burner gas, and recycled to the lower region of such furnace to ensure substantial equilibrium with the ferrous oxide in the partially reduced compacts in such region and to regulate the temperature of such gaseous mixture introduced to the shaft furnace.

15. The process of claim 11, wherein said compacts as discharged from such shaft furnace contain sufficient carbon, not substantially in excess of 1 percent by weight, to perform the specified further reduction of the charge in such subsequent heating stage.

16. The process of treating nickel ore which comprises intimately mixing such ore with a solid reductant, forming such mixture into compacts, heating such compacts at only a relatively low temperature in a first furnace only partially to reduce the nickel compounds and iron compounds of such ore without disintegrating such compacts, without producing a consequential amount of metallic iron, without causing such compacts to stick, and without entire consumption of such reductant, and subsequently heating such prereduced compacts in another furnace to a much higher temperature substantially to complete the reduction of the entire nickel content to metallic nickel and the reduction of a portion only of the iron content to metallic iron thereby to produce molten ferronickel.

17. The process of claim 16, wherein such reductant is particulate carbonaceous material, said ore contains nickel oxide and iron oxide and is finely ground, heating gases of a reducing nature are introduced into such first furnace to ensure substantial equilibrium with ferrous oxide in such partially reduced compacts, and such partially reduced compacts contain a small amount of carbon effective substantially to complete reduction of the nickel oxide to metallic nickel and to reduce a portion only of such ferrous oxide to metallic iron during such subsequent heating at such higher temperature, only sufficient metallic iron being thus produced to extract substantially the maximum amount of metallic nickel from such ore in the form of molten ferronickel, such metallic iron constituting not more than 80 percent of such ferronickel by weight.

18. The process of claim 17, wherein only sufficient ferrous oxide is thus reduced to metallic iron during such subsequent heating to produce molten ferronickel which is approximately one-half iron and one-half nickel by weight.

19. The process of extracting nickel from nickeliferous ores containing substantially more iron than nickel which comprises forming compacts of such ore with a solid reducing agent, preliminarily reducing such iron content to ferrous iron and a substantial amount of such nickel content to metallic nickel without disintegration of such compacts while preserving a portion of such reducing agent therein only sufficient subsequently to complete reduction of substantially all such nickel content to metallic nickel and to reduce such ferrous oxide to produce a substantially equal weight of metallic iron, performing such subsequent reduction at a much higher temperature in a melting furnace, and melting such compacts to ferronickel and slag.

20. A process for the recovery of metallic nickel in the form of ferronickel from a refractory nickeliferous lateritic ore containing at least about 0.5 percent combined nickel by weight and a substantially greater amount of combined iron, comprising grinding such ore and intimately mixing the same with a solid particulate carbonaceous reducing agent, such reducing agent comprising a portion capable of reacting readily with the nickel compounds and the iron compounds of such ore to reduce them in a first heating stage at a temperature below 2,000° F. and a further portion capable of persisting through such first heating stage and of subsequently reducing the nickel and iron compounds then present at a substantially higher temperature of at least approximately 2,600° F., forming such mixture into compacts, passing such compacts through a shaft furnace to heat them to such first heating stage temperature for a period of time sufficient to reduce such combined iron to ferrous oxide without production of metallic iron and without sticking together of such compacts and without disintegrating such compacts and to reduce a substantial portion of such combined nickel to metallic nickel, introducing gases of a reducing nature to such shaft furnace to maintain substantial equilibrium with such ferrous oxide in such partially reduced compacts and prevent reoxidation thereof to ferric oxide, subsequently transferring such partially reduced compacts while still hot under nonoxidizing conditions to an electric melting furnace and there heating the same to a temperature of at least approximately 2,600° F. effective to reduce the remaining nickel compounds to substantially complete the reduction of all such compounds to metallic nickel and to reduce a portion only of such ferrous oxide to metallic iron, the amount of reducing agent persisting through such first heating stage being only sufficient thus to complete reduction of such nickel compounds and of a portion only of such iron compounds to produce a ferronickel containing at least about 20 percent nickel by weight, and melting the resultant ferronickel and slag.

21. The process of extracting nickel from nickeliferous lateritic ore which comprises grinding such ore, mixing the ground ore with a solid particulate carbonaceous reducing agent, forming compacts of such mixture, partially prereducing the nickel and iron compounds of such compacts at a temperature below 2,000° F. to produce a substantial amount of metallic nickel and to produce ferrous oxide without production of metallic iron and without complete destruction of such solid reducing agent, and thereafter heating such prereduced compacts at a much higher temperature effective to melt the same, such solid reducing agent content thereof being present in a predetermined amount effective substantially to complete the reduction of such nickel compounds to metallic nickel and to reduce a predetermined amount only of such ferrous oxide to metallic iron to produce molten ferronickel containing at least 20 percent nickel by weight.

\* \* \* \* \*